United States Patent
Patel

(10) Patent No.: US 8,079,082 B2
(45) Date of Patent: Dec. 13, 2011

(54) VERIFICATION OF SOFTWARE APPLICATION AUTHENTICITY

(75) Inventor: Amol Patel, Los Altos, CA (US)

(73) Assignee: eBay, Inc., San Jose, CA (US)

(*) Notice: Subject to any disclaimer, the term of this patent is extended or adjusted under 35 U.S.C. 154(b) by 742 days.

(21) Appl. No.: 12/165,109

(22) Filed: Jun. 30, 2008

(65) Prior Publication Data

US 2009/0328207 A1 Dec. 31, 2009

(51) Int. Cl.
*G06F 21/00* (2006.01)
(52) U.S. Cl. .................. 726/22; 726/23; 726/24; 726/25
(58) Field of Classification Search .................. None
See application file for complete search history.

(56) References Cited

U.S. PATENT DOCUMENTS

| | | | |
|---|---|---|---|
| 7,966,300 B2 * | 6/2011 | Yoshioka | 707/695 |
| 2006/0026569 A1 * | 2/2006 | Oerting et al. | 717/126 |
| 2007/0198841 A1 * | 8/2007 | Lundblade et al. | 713/176 |
| 2008/0052705 A1 * | 2/2008 | Kaufman et al. | 717/174 |
| 2008/0155698 A1 * | 6/2008 | Round | 726/26 |
| 2009/0112883 A1 * | 4/2009 | Yoshioka | 707/10 |

OTHER PUBLICATIONS

Email Authentication Overview—PayPal, https://www.paypal.com/us/cgi-bin/webscr?cmd=xpt/cps/securitycenter/general/EmailAuthenticationOverview-outside, Jun. 30, 2008, 2 pages.
Email Authentication FAQ—PayPal, https://www.paypal.com/us/cgi-bin/webscr?cmd=xpt/cps/securitycenter/general/EmailAuthenticationFAQ-outside, Jun. 30, 2008, 2 pages.
PayPal Security Key—PayPal, https://www.paypal.com/us/cgi-bin/webscr?cmd=xpt/cps/securitycenter/general/PPSecurityKey-outside, Jun. 30, 2008, 2 pages.
The PayPal Security Key—PayPal, https://www.paypal.com/us/cgi-bin/webscr?cmd=xpt/cps/securitycenter/general/PayPalSecurityKey-outside, Jun. 30, 2008, 2 pages.
PayPal Security Key FAQ, https://www.paypal.com/us/cgi-bin/webscr?cmd=xpt/cps/securitycenter/general/PPSecurityKeyFAQ-outside, Jun. 30, 2008, 3 pages.
Security token—Wikipedia, the free encyclopedia, http://en.wikipedia.org/wiki/Security_token, Jun. 25, 2008, 6 pages.

* cited by examiner

*Primary Examiner* — David Garcia Carvetti
*Assistant Examiner* — Ghazal Shehni
(74) *Attorney, Agent, or Firm* — Haynes and Boone, LLP

(57) ABSTRACT

Various techniques are provided for verifying the authenticity of software applications. Such techniques are particularly useful for verifying the authenticity of software applications used in online transactions involving users, payment service providers, and/or merchants. In one example, a set of application identifiers associated with a plurality of authenticated software applications are maintained and a verification request is received comprising an application identifier associated with an unverified software application. A token is generated in response to the verification request if the application identifier is in the set of application identifiers. The generated token is passed to the unverified software application. A user token is received and processed to determine whether the unverified software application is one of the authenticated software applications. A verification request is sent based on the processing. Additional methods and systems are also provided.

34 Claims, 4 Drawing Sheets

VERIFICATION OF SOFTWARE APPLICATION AUTHENTICITY

BACKGROUND

1. Field of the Invention

The present invention generally relates to information security and more particularly to verifying the authenticity of software applications.

2. Related Art

The security of information in networked computing environments is an important concern for many users and providers of confidential information. To prevent the misuse of confidential information, various techniques have been developed to permit only authorized parties to access such information.

In one approach, a party's identity is authenticated before the party is granted access to confidential information. In this approach, a party may be prompted to enter a correct password, code, or other types of user credentials before being granted access to confidential information. However, such an approach does not preclude a party from accidentally providing confidential information to other unauthorized parties. For example, if a user of a client device inadvertently provides user credentials to an unauthorized party, the user credentials may be subsequently abused by the unauthorized party to access the user's confidential information or perform tasks without the user's permission. As a result, the security previously afforded by the user credentials will be compromised.

Such problems are particularly problematic in circumstances where a rogue software application has been installed on a device without a user's knowledge. For example, the software application may request user credentials or other confidential information from the user, or direct the user to a webpage for entering such information. Without the ability to independently verify the authenticity of the software application, the user may inadvertently provide the user credentials or other confidential information to the software application or an affiliated webpage and thus compromise the security of such information.

Conventional software authentication tools also fail to adequately address such problems. For example, in order to activate a software application for use, a user may be required to provide a preapproved hardware or software key to "unlock" a software application for use. However, such approaches are directed to determining whether a user is authorized to use a given software program. They are not directed to determining whether a software application is in fact a genuinely authentic software application which may be trusted by the user.

Accordingly, there is a need for an improved approach to information security that permits users to verify the authenticity of a software application. Such an improved approach is especially important for users engaged in transactions performed in networked computing environments.

SUMMARY

Various techniques are provided for verifying the authenticity of software applications. Such techniques are particularly useful for verifying the authenticity of software applications used in online transactions involving users, payment service providers, and/or merchants.

In accordance with one embodiment of the invention, a method of verifying authenticity of a software application includes maintaining a set of application identifiers associated with a plurality of authenticated software applications; receiving a verification request comprising an application identifier associated with an unverified software application; generating a token in response to the verification request if the application identifier is in the set of application identifiers; passing the generated token to the unverified software application; receiving a user token; processing the user token to determine whether the unverified software application is one of the authenticated software applications; and sending a verification response based on the processing.

In accordance with another embodiment of the invention, a system includes one or more processors; and one or more memories adapted to store a plurality of machine-readable instructions which when executed by the one or more processors are adapted to cause the system to: maintain a set of application identifiers associated with a plurality of authenticated software applications, receive a verification request comprising an application identifier associated with an unverified software application, generate a token in response to the verification request if the application identifier is in the set of application identifiers, pass the generated token to the unverified software application, receive a user token, process the user token to determine whether the unverified software application is one of the authenticated software applications, and send a verification response based on the processing.

In accordance with another embodiment of the invention, a method of verifying authenticity of a software application includes generating a verification request comprising an application identifier associated with an unverified software application; receiving a generated token in response to the verification request, wherein the generated token is provided by a third party if the application identifier is in a set of application identifiers associated with a plurality of authenticated software applications approved by the third party; and displaying the generated token to a user.

In accordance with another embodiment of the invention, a system includes one or more processors; and one or more memories adapted to store a plurality of machine-readable instructions which when executed by the one or more processors are adapted to cause the system to: generate a verification request comprising an application identifier associated with an unverified software application, receive a generated token in response to the verification request, wherein the generated token is provided by a third party if the application identifier is in a set of application identifiers associated with a plurality of authenticated software applications approved by the third party, and display the generated token to a user.

These and other features and advantages of the present invention will be more readily apparent from the detailed description of the embodiments set forth below taken in conjunction with the accompanying drawings.

DETAILED DESCRIPTION

In accordance with various embodiments disclosed herein, the authenticity of one or more software applications can be verified by confirming whether such applications are registered with a third party, such as a payment service provider, an application developer, or other party. In one embodiment, a user may initiate a verification process from a software application, the authenticity of which has not yet been established. In this regard, the software application may request a token from the third party. The software application displays a token to the user who may then provide the displayed token to the third party independently of the software application. In response, the third party may determine whether the token provided by the user is a valid token and inform the user whether the software application is registered with the third party. Advantageously, this approach permits the user to receive confirmation of the software application's authenticity from the third party in an out-of-band manner (e.g., the verification response is received from the third party rather than the software application itself).

Figure 1:
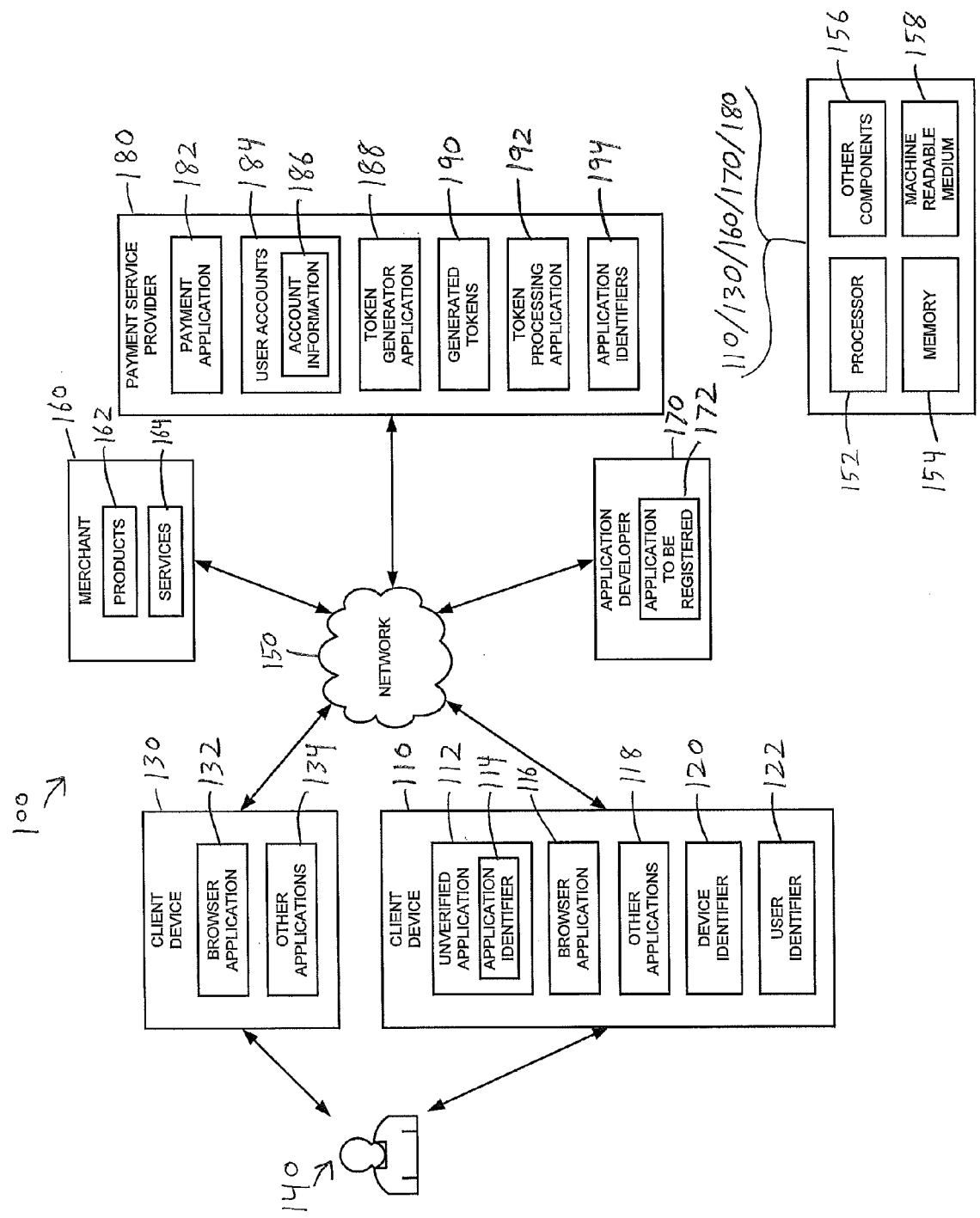
FIG. 1 illustrates a block diagram of a networked system configured to verify the authenticity of a software application in accordance with an embodiment of the invention.

Referring now to the drawings wherein the showings are for purposes of illustrating embodiments of the present invention only, and not for purposes of limiting the same, FIG. 1 illustrates a block diagram of a networked system configured to verify the authenticity of a software application in accordance with an embodiment of the invention. As shown, system 100 includes client devices 110 and 130, a merchant device 160, an application developer device 170, and a payment service provider device 180 in communication over a network 160. FIG. 1 further illustrates a user 140 (e.g., a person) in communication with client devices 110 and 130.

As further illustrated in FIG. 1, client device 110, client device 130, merchant device 160, application developer device 170, and payment service provider device 180 may each be implemented by one or more processors 152, memories 154, and other appropriate components 156 for executing instructions such as program code and/or data stored on one or more machine readable mediums 158 to implement the various applications, data, and steps described herein. In various embodiments, such instructions may be stored in one or more machine readable mediums such as memories or data storage devices internal to the devices, external to the devices, and/or accessible by the devices over network 150.

Network 150 may be implemented as a single network or a combination of multiple networks. For example, in various embodiments, network 150 may include the Internet or one or more intranets, landline networks, wireless networks, and/or other appropriate types of networks.

Client device 110 and client device 130 may be implemented using any appropriate combination of hardware and/or software configured for wired and/or wireless communication over network 150. For example, in one embodiment, one or both of client devices 110 and 130 may be implemented as a personal computer of user 140 in communication with the Internet. In other embodiments, one or both of client devices 110 and 130 may be implemented as a wireless telephone, personal digital assistant (PDA), notebook computer, and/or other types of computing devices.

As shown, client device 110 may include a plurality of software applications. Specifically, client device 110 may include an unverified software application 112, a browser application 116, and/or other applications 118.

Application 112 may be any software application that user 140 may wish to verify is authentic in accordance with various embodiments described herein. For example, in one embodiment, application 112 may be a software application downloaded by user 140 to client device 110 (for example, a copy of application 172 further described herein). In another embodiment, application 112 may be a software application provided to client device 110 by another party.

An application identifier 114 associated with application 112 may be used to identify application 112 to payment service provider device 180. In one embodiment, user 140 may initiate a verification process in which application identifier 114 is passed to payment service provider device 180 as part of a process to determine whether application 112 is a software application that has been registered with payment service provider device 180.

Browser application 116 may be used, for example, to provide a convenient interface for user 140 to browse information available over network 150. For example, in one embodiment, browser application 116 may be implemented as a web browser configured to view webpages or other content available over the Internet.

Other applications 118 denote any other software application that may be desired in particular embodiments to provide additional features to client device 110. For example, in various embodiments, such other applications 118 may include security applications for implementing client-side security features, programmatic client applications for interfacing with appropriate application programming interfaces (APIs) over network 160, or other types of applications. Client device 110 may also include a device identifier 120 to identify client device 110 to payment service provider device 180, and a user identifier 122 to identify user 140 payment service provider device 180.

As also shown in FIG. 1, client device 130 may also include a browser application 132 and other applications 134. Browser application 132 and other applications 134 may be implemented, for example, in a similar fashion to browser application 116 and other applications 118, respectively, of client device 110.

Merchant device 160 may be associated, for example, with an online merchant offering various products 162 and/or services 164 in exchange for payment to be received over network 150. For example, in one embodiment, merchant device 160 may provide products 162 and/or services 164 (e.g., software applications, software licenses, software content, or other products or services) available for purchase by user 140 over network 150 using client device 110 or client device 130.

Application developer device 170 may be associated, for example, with a developer of a software application 172. For example, in one embodiment, a developer may register software application 172 with payment service provider device 180 as further described herein.

Payment service provider device 180 may be associated, for example, with an online payment service provider which may provide payment on behalf of user 140 to the operator of merchant device 160. In this regard, payment service provider device 180 includes a payment application 182 which may be configured to interact with client devices 110 and 130, and merchant device 160 over network 150 to facilitate the purchase of products 162 and/or services 164 by user 140 from merchant device 160. In one embodiment, payment service provider device 180 may be provided by PayPal, Inc.

Payment service provider device 180 also maintains a plurality of user accounts 184, each of which may include account information 186 associated with individual users. For example, in one embodiment, account information 186 may include private financial information of user 140 such as account numbers, passwords, credit card information, bank information, or other information which may be used to facilitate online transactions by user 140. Advantageously, payment application 182 may be configured to interact with merchant device 160 on behalf of user 140 during a transaction without requiring user 140 to provide account information 186 to merchant device 160. In this regard, payment application 182 may be configured to authorize a transaction in response to user 140 successfully logging in to payment service provider device 180. In one embodiment, user 140 may log in to payment service provider device 180 by providing user credentials such as, for example, user identifier 122, an electronic mail address, a password, a telephone number, a personal identification number (PIN), a physical address, and/or other appropriate information.

Payment service provider device 180 further includes a token generator application 188 which may be used to generate a plurality of tokens 190 in response to verification requests received by payment service provider device 180 over network 150. For example, token generator application 188 may be implemented in accordance with various appropriate techniques for generating tokens 190 from an initial seed value (e.g., key). In various embodiments, application identifier 114, device identifier 120, user identifier 122, and/or other information may be used as seed values from which tokens 190 are generated. In one embodiment, each of tokens 190 is configured to expire following a limited time period (e.g., three minutes or another appropriate time period) after they are generated. In another embodiment, each of tokens 190 is configured to be processed only once in response to a verification request.

Tokens 190 may be implemented using any appropriate letters, numbers, symbols, or other content. For example, in one embodiment, each of tokens 190 is implemented as a six digit code or number.

Payment service provider device 180 also includes a token processing application 192 which may be used to process tokens 190 as well as user tokens received by payment service provider device 180 as further described herein. Token processing application 192 may also be used to generate verification responses based on such processing as further described herein.

In addition, payment service provider device 180 maintains a set of application identifiers 194 associated with a plurality of authenticated software applications. In this regard, each of application identifiers 194 is associated with a software application that has been registered with payment service provider device 180.

Figure 2:
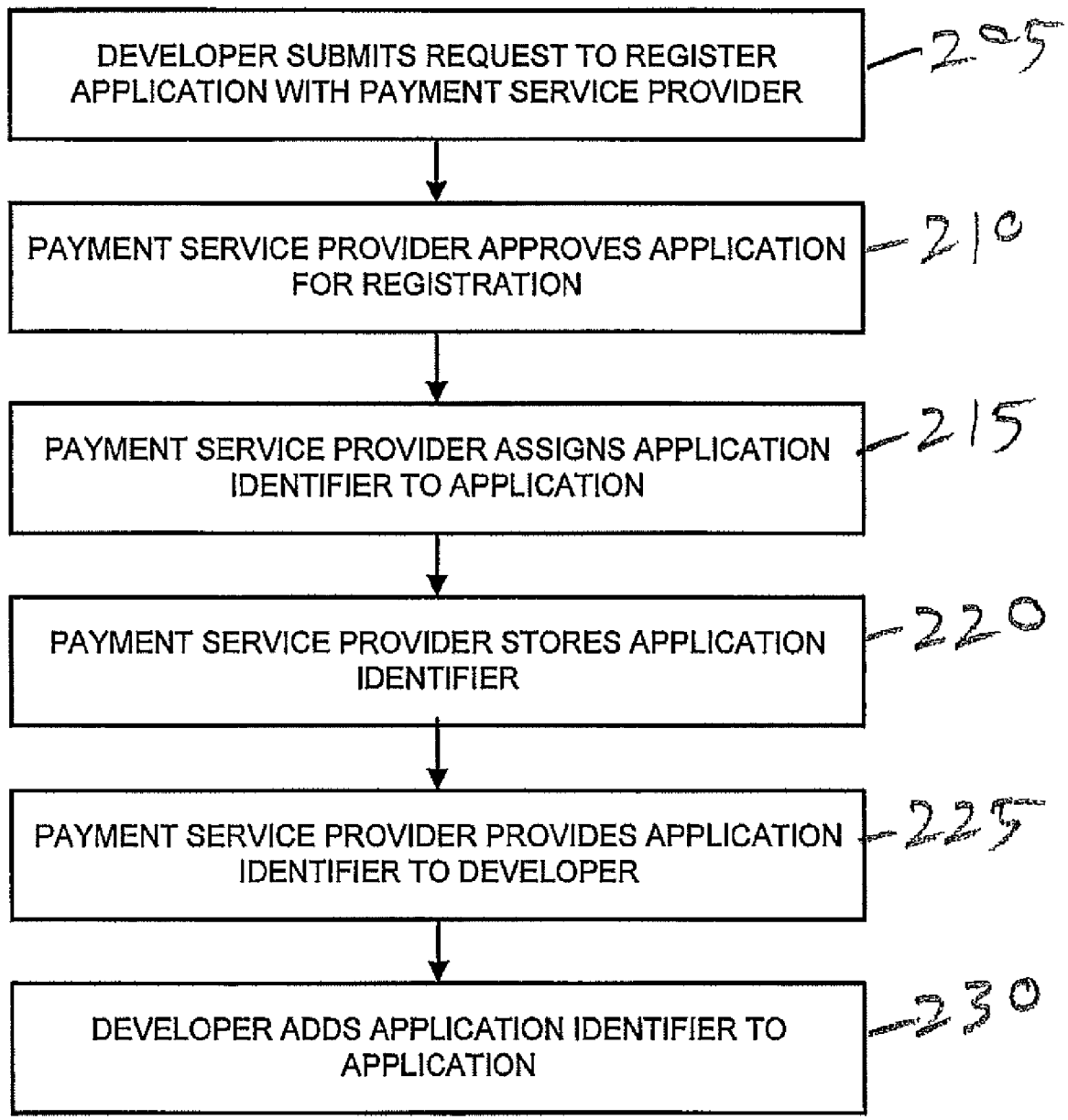
FIG. 2 illustrates a process of registering a software application in accordance with an embodiment of the invention.

FIG. 2 illustrates a process of registering a software application with a payment service provider in accordance with an embodiment of the invention. In step 205, application developer device 170 submits to payment service provider device 180 a request to register software application 172. For example, in one embodiment, software application 172 may be an application that, when running on client device 110, may be configured to direct user 140 to provide appropriate user credentials to log in to payment service provider device 180.

If payment service provider device 180 approves the request (step 210), then payment service provider device 180 assigns an application identifier to the software application (step 215) and stores the newly assigned application identifier in the set of application identifiers 194 maintained by payment service provider device 180 (step 220). Payment service provider device 180 then provides the newly assigned application identifier to application developer device 170 (step 225) which adds the application identifier to the software application (step 230).

Accordingly, following the process of FIG. 2, software application 172 will be registered with payment service provider device 180 and authorized by payment service provider device 180 to receive user credentials from user 140 as discussed. The process of FIG. 2 may be repeated for different software applications and/or different developers to register a plurality of software applications with payment service provider device 180 to populate the set of application identifiers 194. Other embodiments are also contemplated. For example, in another embodiment, software application 172 may be registered with application developer device 170 instead of, or in addition to, payment service provider device 180.

Figure 3:
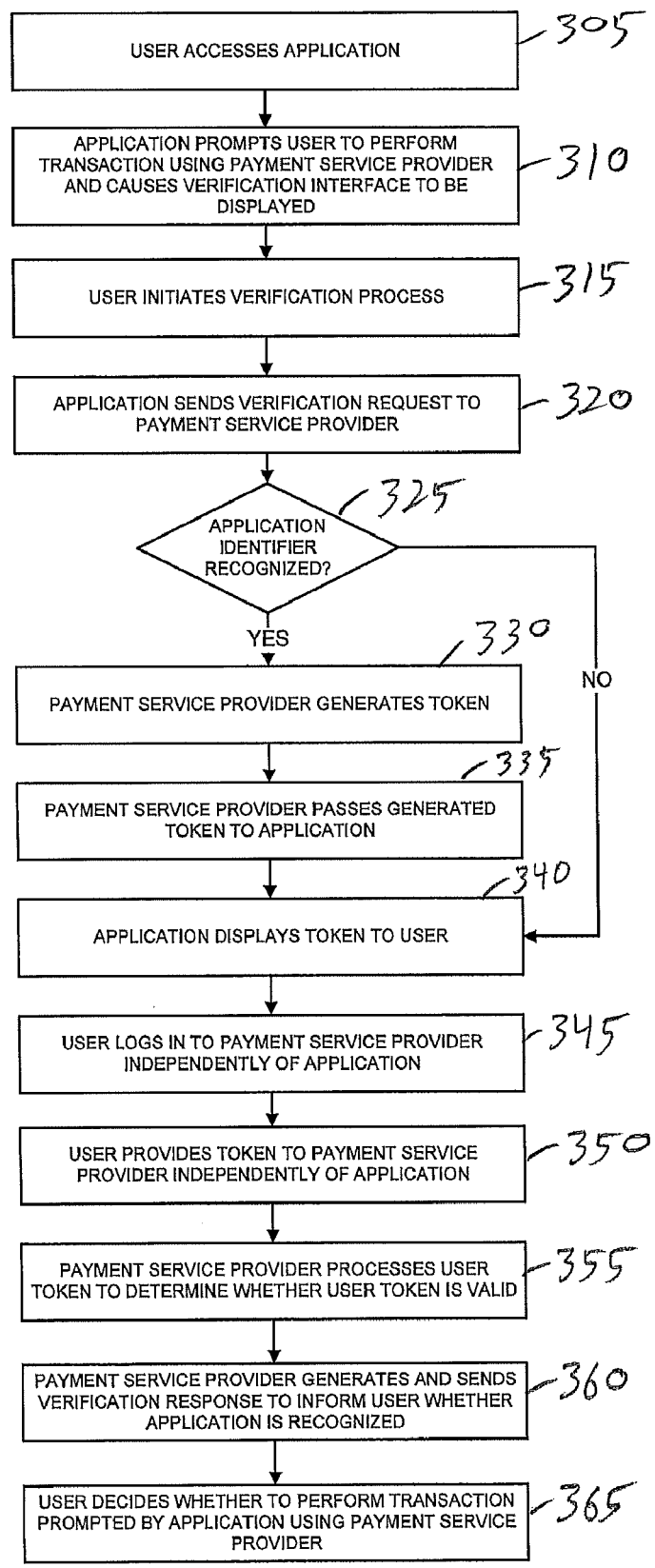
FIG. 3 illustrates a process of verifying authenticity of a software application in accordance with an embodiment of the invention.

FIG. 3 illustrates a process of verifying authenticity of a software application in accordance with an embodiment of the invention. The process of FIG. 3 may be performed, for example, to determine whether application 112 is registered with payment service provider device 180 and authorized by payment service provider device 180 to receive user credentials from user 140.

In step 305, user 140 accesses application 112. For example, in one embodiment, application 112 may be a software application running on client device 110 as illustrated in FIG. 1. However, in other embodiments, application 112 may run on one or more remote servers and may be accessed by user 140 through client device 110 or 130.

In step 310, application 112 prompts user 140 to perform a transaction (e.g., a purchase or similar transaction) using the services of payment service provider device 180. For example, in one embodiment, application 112 may provide a user-selectable link which, when selected by user 140, will direct user 140 to a webpage that requests user credentials recognized by payment service provider device 180 (e.g., a webpage that purports to be associated with payment service provider device 180). In another embodiment, application 112 may provide a user interface that prompts user 140 to provide such user credentials to application 112 which passes the user credentials to payment service provider device 180 through an API recognized by payment service provider device 180. However, in either case, user 140 will not have an independent confirmation as to the authenticity of application 112 during step 310. In this regard, user 140 will not know whether the prompt of step 310 is in fact a legitimate request for user credentials or is a fraudulent request from a rogue software application.

Also in step 310, application 112 causes a verification interface to be displayed to user 140 which, when selected by user 140, will initiate a process to verify the authenticity of application 112. In one embodiment, application 112 may be implemented to provide the verification interface. In another embodiment, application 112 may be implemented to instruct another application (e.g., one of other applications 118) to provide the verification interface.

Figure 4:
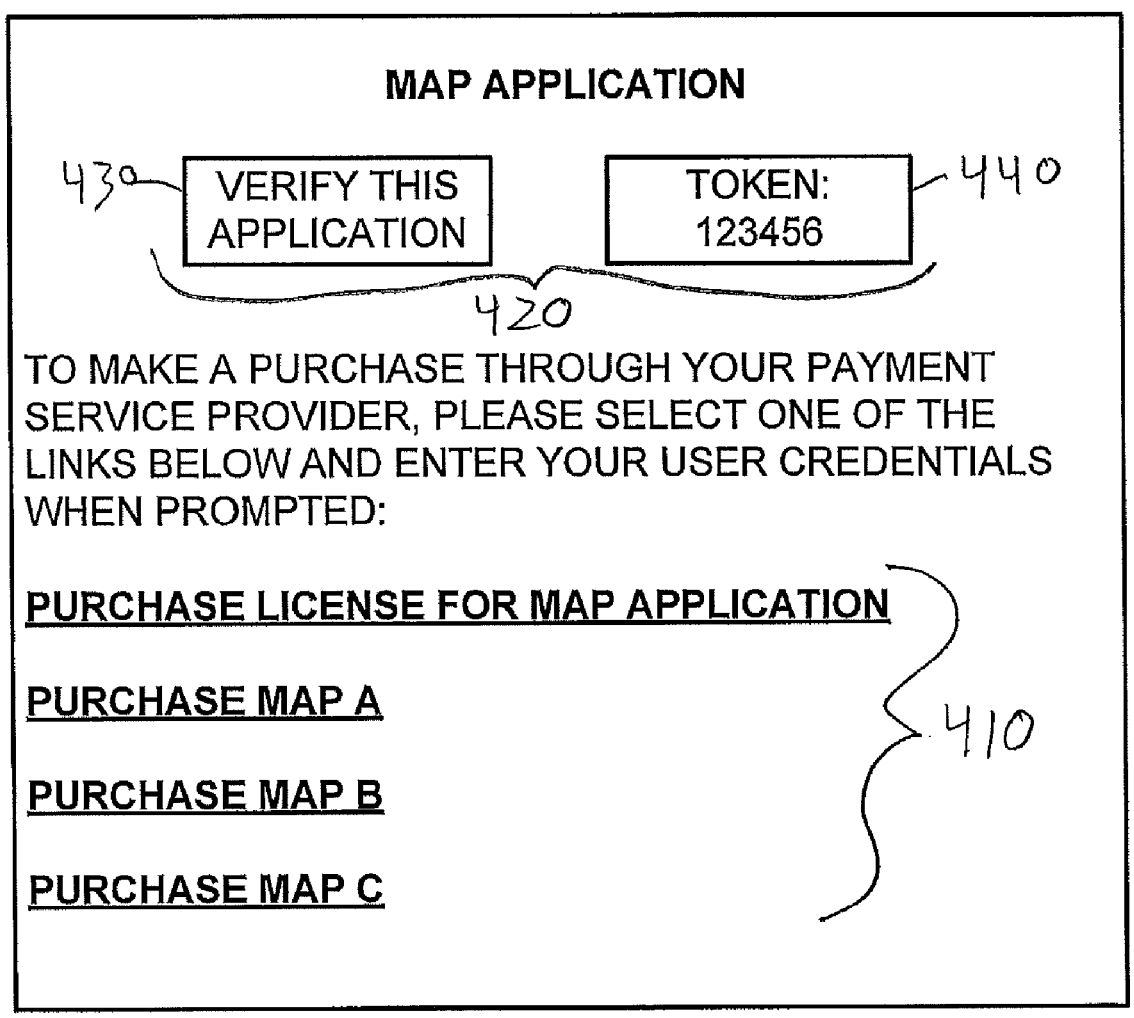
FIG. 4 illustrates a sample user interface displayed to a user during the process of FIG. 3 in accordance with an embodiment of the invention.

FIG. 4 illustrates a sample user interface 400 displayed to a user during the process of FIG. 3 in accordance with an embodiment of the invention. For example, user interface 400 may be provided by application 112 during step 310 of FIG. 3.

User interface 400 includes user-selectable links 410 which, when selected by user 140, purport to direct user 140 to a webpage that requests user credentials recognized by payment service provider device 180 in order to purchase various products or services. For example, in the embodiment shown in FIG. 4, application 112 purports to be a map application that permits user 140 to purchase a user license for the map application as well as additional map content by selecting various links 410. In this embodiment, upon the user's 140 selection of one of links 410, application 112 may direct user 140 to a webpage (e.g., by opening browser application 116) into which user 140 may enter user credentials recognized by payment service provider device 180.

FIG. 4 further illustrates a verification interface 420 including a verification button 430 and a token window 440. As further described herein, verification button 430 may be selected by user 140 to initiate a process to verify the authenticity of application 112. As also further described herein, token window 440 may display one of tokens 190 to user 140. Other types of graphical user interfaces, text based user interfaces, or other user interfaces may be used where appropriate.

Referring again to FIG. 3, in step 315, user 140 initiates a verification process to determine whether application 112 is an authenticated software application recognized by payment service provider device 180. For example, in one embodiment, step 315 may be performed by user 140 selecting verification button 430 of FIG. 4. In another embodiment, step 315 may be performed by user 140 selecting a link provided by application 112.

In step 320, application 112 sends a verification request including the application identifier 114 associated with application 112 to payment service provider device 180. In one embodiment, the verification request is an inquiry to determine whether application 112 is approved by payment service provider device 180 to direct user 140 to provide user credentials recognized by payment service provider device 180. The verification request may be sent, for example, in accordance with an API recognized by payment service provider device 180.

In step 325, payment service provider device 180 receives the verification request and determines whether the application identifier 114 sent with the verification request is in the set of application identifiers 194 maintained by payment service provider device 180. In this regard, if the application identifier 114 is found in the set of application identifiers 194, then application 112 will be recognized by payment service provider device 180 as one of the software applications previously registered with payment service provider device 180 through, for example, the process of FIG. 2. In this case, the process of FIG. 3 continues to step 330. Otherwise, the process of FIG. 3 may optionally continue to step 340.

In step 330, token generator application 188 generates one of tokens 190 in response to the verification request sent in step 320 in accordance with the various techniques described herein. Then, in step 335, payment service provider device 180 passes the token generated in step 330 to application 112.

In step 340, application 112 displays a token to user 140. For example, in one embodiment, step 340 may be performed by application 112 displaying a token in token window 440 of FIG. 4. In the example illustrated in FIG. 4, the token displayed in token window 440 corresponds to a six digit number: 123456. If application 112 is indeed an authentic software application that has been registered with payment service provider device 180, then the token displayed in step 340 will correspond to the actual token passed to application 112 in step 335 and is therefore one of tokens 190 maintained by payment service provider device 180. However, if application 112 is a rogue application, then the token displayed in step 340 is likely a fraudulent token which was not generated by token generator application 188 and is not one of tokens 190 maintained by payment service provider device 180.

In step 345, user 140 logs in to payment service provider device 180 independently of application 112. In this step, user 140 will not log in to payment service provider device 180 using a webpage, link, or other information provided by application 112 in step 345. Rather, user 140 will log in to payment service provider device 180 using a webpage, link, or other information trusted by user 140. For example, in one embodiment, user 140 may use browser application 116 of client device 110 to access a webpage known to be associated with payment service provider device 180. In another embodiment, user 140 may use browser application 132 of client device 130 to access such a webpage.

To log in to payment service provider device 180 in step 345, user 140 may provide appropriate user credentials recognized by payment service provider device 180. In this regard, it is assumed that user 140 either has an existing user account 184 with payment service provider device 180 or creates a user account 184 during step 345.

After a successful log in is performed, user 140 provides the token previously displayed during step 340 to payment service provider device 180 (step 350). For example, in one embodiment, a webpage provided by payment service provider device 180 may provide an appropriate user interface to permit user 140 to enter the token. The token entered by user 140 in step 350 is also referred to as a user token.

In step 355, token processing application 192 processes the user token received in step 350 to determine whether application 112 is one of the authenticated software applications associated with application identifiers 194. For example, in one embodiment, payment service provider device 180 compares the user token provided in step 350 and the generated token provided in step 330 to determine whether application 112 is an authenticated software application based on whether the user token matches the generated token. In another embodiment, payment service provider device 180 compares the user token provided in step 350 to any of tokens 190 to determine whether application 112 is an authenticated software application based on whether the user token matches any of the tokens 190.

In one embodiment, if the user token does not match the generated token or any of tokens 190, then token processing application 192 will determine that the user token is invalid. For example, this may occur if the generated token has expired or if the user token was fraudulently provided by a rogue software application. In another embodiment, if the user token matches the generated token or any of tokens 190, then token processing application 192 will determine that the user token is valid and application 112 is recognized by payment service provider device 180.

In step 360, token processing application 192 generates and sends a verification response to inform user 140 whether application 112 is recognized by payment service provider device 180 as an authentic software application that has been registered with payment service provider device 180. In one embodiment, the verification response may be sent to the same device from which payment service provider device 180 received the user token. For example, if user 140 provided the user token using browser application 116 of client device 110 or browser application 132 of client device 130, then the verification response may be sent back to browser application 116 of client device 110 or browser application 132 of client device 130, respectively. In such cases, the verification response may be provided as a webpage. However, other formats are also contemplated such a text messages, electronic mail messages, images, and other appropriate formats.

Accordingly, if the verification response of step 360 indicates that application 112 is recognized by payment service provider device 180, then user 140 will be informed that application 112 is likely not a rogue software application. However, if the verification response of step 360 indicates that application 112 is not recognized by payment service provider device 180, then user 140 will be informed that application 112 may be a rogue software application. In either case, user 140 may make an informed choice regarding whether or not to perform one or more transactions prompted by application 112 (step 365).

In view of the present disclosure, it will be appreciated that various techniques described herein may be used to authenticate software applications accessed by users. Although particular embodiments have been described in which an application is verified by a payment service provider, the disclosed techniques may be used in any appropriate context in which the authentication of software applications is desired. For example, in another embodiment, an application may be verified by an application developer. In such an embodiment, appropriate components of payment service provider device 180 may be implemented in application developer device 170 to permit application developer device 170 to perform verification-related steps of the method of FIG. 3 previously described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus the invention is limited only by the claims.

What is claimed is:

1. A method of verifying authenticity of a software application, the method comprising:
   maintaining, by a payment service provider device, a set of application identifiers associated with a plurality of authenticated software applications;
   receiving, by the payment service provider device, a verification request comprising an application identifier associated with an unverified software application;
   generating, by the payment service provider device, a token in response to the verification request if the application identifier is in the set of application identifiers;
   passing, by the payment service provider device, the generated token to the unverified software application;
   receiving, by the payment service provider device, a user token independent of the unverified software application;
   processing, by the payment service provider device, the user token to determine whether the unverified software application is one of the authenticated software applications; and
   sending, by the payment service provider device, a verification response based on the processing.

2. The method of claim 1, wherein the receiving a verification request comprises receiving the verification request from the unverified software application running on a client device, wherein the passing the generated token comprises passing the generated token to the client device.

3. The method of claim 2, wherein the generating comprises generating the token using a device identifier associated with the client device, the application identifier associated with the unverified software application, and/or a user identifier associated with a user of the unverified software application.

4. The method of claim 1, wherein the generated token is configured to expire after a limited time period.

5. The method of claim 1, wherein the processing the user token comprises comparing the user token and the generated token to determine whether the unverified software application is one of the authenticated software applications based on whether the user token matches the generated token.

6. The method of claim 1, further comprising maintaining a plurality of generated tokens associated with a plurality of verification requests, wherein the processing the user token comprises comparing the user token to any of the generated tokens to determine whether the unverified software application is one of the authenticated software applications based on whether the user token matches any of the generated tokens.

7. The method of claim 1, wherein the verification request is received from a first client device, the user token is received from a second client device, and the verification response is sent to the second client device.

8. The method of claim 1, wherein the method is performed by a payment service provider device, wherein the authenticated software applications are approved by the payment service provider device to direct a user to provide user credentials recognized by the payment service provider device.

9. The method of claim 1, wherein the method is performed by an application developer device.

10. A system comprising:
    one or more processors; and
    one or more memories adapted to store a plurality of machine-readable instructions which when executed by the one or more processors are adapted to cause the system to:
    maintain, by a third party, a set of application identifiers associated with a plurality of authenticated software applications,
    receive a verification request comprising an application identifier associated with an unverified software application,
    generate a token in response to the verification request if the application identifier is in the set of application identifiers,
    pass the generated token to the unverified software application,
    receive a user token, by the third party, independent of the unverified software application,
    process the user token to determine whether the unverified software application is one of the authenticated software applications, and
    send a verification response based on the processing.

11. The system of claim 10, wherein the verification request is provided by the unverified software application on a client device, wherein the machine-readable instructions when executed by the one or more processors are adapted to cause the system to pass the generated token to the client device.

12. The system of claim 11, wherein the machine-readable instructions when executed by the one or more processors are adapted to cause the system to generate the token using a device identifier associated with the client device, the application identifier associated with the unverified software application, and/or a user identifier associated with a user of the unverified software application.

13. The system of claim 10, wherein the generated token is configured to expire after a limited time period.

14. The system of claim 10, wherein the machine-readable instructions when executed by the one or more processors are adapted to cause the system to compare the user token and the generated token to determine whether the unverified software application is one of the authenticated software applications based on whether the user token matches the generated token.

15. The system of claim 10, wherein the machine-readable instructions when executed by the one or more processors are adapted to cause the system to:
    maintain a plurality of generated tokens associated with a plurality of verification requests; and
    compare the user token to any of the generated tokens to determine whether the unverified software application is one of the authenticated software applications based on whether the user token matches any of the generated tokens.

16. The system of claim 10, wherein the verification request is received from a first client device, the user token is received from a second client device, and the verification response is sent to the second client device.

17. The system of claim 10, wherein the system is a payment service provider device, wherein the authenticated software applications are approved by the payment service provider device to direct a user to provide user credentials recognized by the payment service provider device.

18. The system of claim 10, wherein the system is an application developer device.

19. A method of verifying authenticity of a software application, the method comprising:
    providing access to an unverified software application by a client device;
    generating, by the unverified software application accessed via the client device, a verification request comprising an application identifier associated with the unverified software application;
    receiving, by the unverified software application accessed via the client device, a generated token in response to the verification request, wherein the generated token is provided by a third party if the application identifier is in a set of application identifiers associated with a plurality of authenticated software applications approved by the third party; and
    displaying, on a user interface of the client device, the generated token to a user, wherein the displayed generated token is provided to the third party by the user independently of the unverified software application for processing by the third party.

20. The method of claim 19, further comprising:
    receiving a user token;
    passing the user token to the third party; and
    receiving a verification response that confirms whether the unverified software application is one of the authenticated software applications, wherein the verification response is based on processing of the user token performed by the third party.

21. The method of claim 19, wherein the generating a verification request is performed in response to a user-initiated selection.

22. The method of claim 19, wherein the method is performed by the unverified software application.

23. The method of claim 19, wherein the unverified software application runs on a client device associated with the user.

24. The method of claim 19, wherein the generated token is configured to expire after a limited time period.

25. The method of claim 19, wherein the third party is a payment service provider device, wherein the authenticated software applications are approved by the payment service provider device to direct the user to provide user credentials recognized by the payment service provider device.

26. The method of claim 19, wherein the third party is an application developer device.

27. A system comprising:
    one or more processors; and
    one or more memories adapted to store a plurality of machine-readable instructions which when executed by the one or more processors are adapted to cause the system to:
    generate a verification request comprising an application identifier associated with an unverified software application,
    receive a generated token in response to the verification request, wherein the generated token is provided by a third party if the application identifier is in a set of application identifiers associated with a plurality of authenticated software applications approved by the third party, and display the generated token to a user, wherein the displayed generated token is provided to the third party independently of the unverified software application for processing by the third party.

28. The system of claim 27, wherein the machine-readable instructions when executed by the one or more processors are adapted to cause the system to:
    receive a user token;
    pass the user token to the third party; and
    receive a verification response that confirms whether the unverified software application is one of the authenticated software applications, wherein the verification response is based on a process performed by the third party on the user token.

29. The system of claim 27, wherein the machine-readable instructions when executed by the one or more processors are adapted to cause the system to generate the verification request in response to a user-initiated selection.

30. The system of claim 27, wherein the machine-readable instructions comprise the unverified software application.

31. The system of claim 27, wherein the system is a client device associated with the user.

32. The system of claim 27, wherein the generated token is configured to expire after a limited time period.

33. The system of claim 27, wherein the third party is a payment service provider device, wherein the authenticated software applications are approved by the payment service provider device to direct the user to provide user credentials recognized by the payment service provider device.

34. The system of claim 27, wherein the third party is an application developer device.

* * * * *